UNITED STATES PATENT OFFICE.

AXEL EDMUND BERNHARD GRAM, OF COPENHAGEN, DENMARK.

METHOD OF IMPROVING COFFEE.

No. 843,530.  Specification of Letters Patent.  Patented Feb. 5, 1907.

Application filed June 5, 1906. Serial No. 320,366.

*To all whom it may concern:*

Be it known that I, AXEL EDMUND BERNHARD GRAM, a subject of the King of Denmark, and a resident of Copenhagen, Denmark, have invented a new and useful Method of Improving Coffee, which invention is fully set forth in the following specification.

It is well known that many articles the flavor or odor of which depends on a greater or smaller content of certain aromatic substances frequently do not possess their good qualities to such extent as when they have been subjected to a longer or shorter seasoning. Coffee, for example, is sometimes seasoned for several years for this purpose. It is obvious that such seasoning increases the price of the goods concerned to a great extent, owing to the loss of time and interest. Considerable space is required also, and the seasoning has often an injurious effect on other good properties of the goods.

The invention relates to a method by which it, in a very short time, can give coffee and tea the qualities required, so that the expensive seasoning is avoided, the required increase of flavor and odor being effected comparatively quickly.

It is known to promote the ripening of such articles by oxidation by using oxygen or ozone; nor is it something new to use nitric oxids for improving articles of food, as flour and groats. If, however, coffee or the like is mixed with ozone, its good qualities will depend on using just the correct amount of ozone, which is very difficult to carry through in practice. The treatment with ozone requires, moreover, a very expensive plant.

According to the present invention coffee or tea is treated with nitric oxids, (nitrogen dioxid $NO_2$.) If not a too great surplus of this is used, it does not damage these goods in any way. As dry air charged with nitric oxid may be used as far as the solid goods are concerned, no arrangement for removing an eventual surplus of the medium for treating is required. The treatment with nitric oxids is, moreover, much cheaper than the treatment with ozone.

For the purpose of illustrating the preferred method of carrying out the invention as applied to coffee, the raw unroasted coffee-beans are passed, by gravity, through a tube made, preferably, of wood, having at its lower end a slide for regulating the flow of the beans. Through an opening near the base of the tube an acid-forming oxid of nitrogen, such as nitric-oxid gas, is introduced to act upon the beans, preferably at the ordinary temperature of the room, as they slowly pass through the tube. The quantity of nitric oxid required for a given weight of beans varies within wide limits, depending upon the kind of beans and the flavor and odor desired. As the result of experiment it has been found that for about three hundred and seventy grams of coffee two hundred and fifty cubic centimeters of nitric-oxid gas under ordinary conditions of temperature and pressure are an extreme limit. Usually a smaller quantity of nitric-oxid gas for this weight of coffee-beans suffices for bringing out the desired flavor. The coffee-beans are then roasted in the usual manner.

As the apparatus referred to above forms no part of the present invention and may be replaced by any other arrangement whereby the beans may be subjected to the action of the gas, it is deemed unnecessary to show it in a drawing.

In the specific illustration of the process I have described its application to raw coffee-beans; but it is equally applicable to tea-leaves for bringing out their flavor and odor. In the claims I have only mentioned coffee; yet it is to be understood that I do not desire to limit the application of the method to coffee alone, as it is equally applicable to tea-leaves.

The method consists, therefore, mainly in subjecting the goods concerned for some time to the action of nitric oxids (especially nitrogen dioxid) or air charged with this substance, whereby the required effect is quickly obtained.

Having thus described my invention, I claim as new and desire to secure by Letters Patent—

1. The process of improving the odor and flavor of coffee, consisting in mingling unroasted coffee with an acid forming oxid of nitrogen whereby the gas reacts on said coffee to develop its odor and flavor.

2. The process of improving the odor and flavor of coffee consisting in mingling unroasted coffee with nitrogen dioxid whereby the gas reacts on said coffee to develop its odor and flavor.

3. The process of improving the odor and flavor of coffee consisting in mingling unroasted coffee with nitrogen dioxid and air whereby the gas reacts on said coffee to develop its odor and flavor.

4. The process of improving the odor and flavor of coffee consisting in mingling unroasted coffee with nitrogen dioxid to react on the coffee to develop its odor and flavor and then roasting the resulting product.

In testimony whereof I have signed this specification in the presence of two subscribing witnesses.

AXEL EDMUND BERNHARD GRAM.

Witnesses:
JAN CHRISTOPHERSEN,
VIGGO BLOM.